US012731880B2

(12) United States Patent
Kang et al.

(10) Patent No.: US 12,731,880 B2
(45) Date of Patent: Sep. 8, 2026

(54) TM DUAL-MODE DIELECTRIC RESONATOR AND TM DUAL-MODE FILTER

(71) Applicant: Telefonaktiebolaget LM Ericsson (publ), Stockholm (SE)

(72) Inventors: Haiju Kang, Beijing (CN); Xueyuan Zhang, Beijing (CN); Weidong Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 18/847,471

(22) PCT Filed: Mar. 23, 2022

(86) PCT No.: PCT/CN2022/082495
§ 371 (c)(1),
(2) Date: Sep. 16, 2024

(87) PCT Pub. No.: WO2023/178551
PCT Pub. Date: Sep. 28, 2023

(65) Prior Publication Data
US 2025/0246793 A1 Jul. 31, 2025

(51) Int. Cl.
*H01P 7/10* (2006.01)
*H01P 1/208* (2006.01)

(52) U.S. Cl.
CPC ............ *H01P 7/105* (2013.01); *H01P 1/2086* (2013.01)

(58) Field of Classification Search
CPC ............................... H01P 7/105; H01P 1/2086
See application file for complete search history.

(56) References Cited

U.S. PATENT DOCUMENTS 5,796,320 A 8/1998 Hattori et al.
5,880,650 A 3/1999 Latouche et al.

FOREIGN PATENT DOCUMENTS

CN 108336459 A 7/2018
CN 114079129 A 2/2022
(Continued)

OTHER PUBLICATIONS

Miek, Daniel, et al., "Realization of Cross-Coupled X- and Y-Shaped Dual Mode Dielectric Resonator Filters," Asia-Pacific Microwave Conference, Nov. 6, 2018, pp. 506-508.
(Continued)

*Primary Examiner* — Andrea Lindgren Baltzell
*Assistant Examiner* — Kimberly E Glenn
(74) *Attorney, Agent, or Firm* — Withrow & Terranova, PLLC

(57) ABSTRACT

A TM dual-mode dielectric resonator, comprising: a metal cavity; and a TM dielectric resonator body located in the cavity and having grounding surfaces connected with walls of the cavity so that two electric fields are formed in first and second directions perpendicular to each other, characterized in that, two end surfaces of the TM dielectric resonator body which are perpendicular to the first direction and a first end surface of the TM dielectric resonator body which is perpendicular to the second direction are configured as the grounding surfaces, and a second end surface of the TM dielectric resonator body which is perpendicular to the second direction is placed in a non-grounding state. The present disclosure also relates to a TM dual-mode filter comprising an above-said TM dual-mode dielectric resonator.

13 Claims, 9 Drawing Sheets

(56) References Cited

FOREIGN PATENT DOCUMENTS

| | | | | | |
|---|---|---|---|---|---|
| EP | 0661770 | B1 | | 10/2001 | |
| FI | 115338 | B | * | 4/2005 | ............ H01P 1/2086 |
| WO | 2004066430 | A1 | | 8/2004 | |

OTHER PUBLICATIONS

Extended European Search Report for European Patent Application No. 22932618.6, mailed Sep. 17, 2025, 8 pages.

International Search Report and Written Opinion for International Patent Application No. PCT/CN2022/082495, mailed Nov. 25, 2022, 9 pages.

* cited by examiner

TM DUAL-MODE DIELECTRIC RESONATOR AND TM DUAL-MODE FILTER

This application is a 35 U.S.C. § 371 national phase filing of International Application No. PCT/CN2022/082495, filed Mar. 23, 2022, the disclosure of which is incorporated herein by reference in its entirety.

TECHNICAL FIELD

The present disclosure generally relates to the technical field of a filter and, more particularly, to a TM dual-mode dielectric resonator and a TM dual-mode filter comprising the TM dual-mode dielectric resonator.

BACKGROUND

This section introduces aspects that may facilitate better understanding of the present disclosure. Accordingly, the statements of this section are to be read in this light and are not to be understood as admissions about what is in the prior art or what is not in the prior art.

The multiple-input and multiple-output (MIMO) technology is widely used in a Sub-6 GHZ base station product, which requires a lot of filter units (FUs) to be integrated with an antenna unit (AU) or a radio unit (RU). For saving cost and space, FUs are usually soldered onto a radio mother board, a low pass filter (LPF) board, an antenna calibration (AC) board or a power splitter board, which means smaller and lighter FUs are quite in demand.

In recent years, as the construction of 5G communication network is rapidly advancing, more demanding requirements are raised for filters: for example, better performance with lower cost and cheaper price, etc.

Currently the following problems have occurred in existing dual-mode filters: 1) the high-order harmonics of a dual-mode resonator are too close to the passband, and the filter rejection is poor; 2) a low-pass filter with a lower cutoff frequency is required in order to solve the harmonics problem of the dual-mode resonator, but it will increase the overall insertion loss of the filter; and 3) the manufacturing process for the existing dual-model filters is complicated and also the existing dual-model filters exhibit worse intermodulation performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for a dual-mode filter with good filter harmonic performance and small size, which can be widely used in macro base station and micro base station products.

According to a first aspect of the disclosure, there is provided TM dual-mode dielectric resonator, comprising: a metal cavity; and a TM dielectric resonator body located in the cavity and having grounding surfaces connected with walls of the cavity so that two electric fields are formed in first and second directions perpendicular to each other. Two end surfaces of the TM dielectric resonator body which are perpendicular to the first direction and a first end surface of the TM dielectric resonator body which is perpendicular to the second direction are configured as the grounding surfaces, and a second end surface of the TM dielectric resonator body which is perpendicular to the second direction is placed in a non-grounding state.

In an embodiment of the disclosure, at least one of the grounding surfaces is in grounding connection with a wall of the cavity by means of an immediate grounding structure. The immediate grounding structure comprising a metal sheet attached to the grounding surface and a stepped blind hole formed in the wall of the cavity, wherein the stepped blind hole comprises a large hole portion for receiving the metal sheet and a small hole portion over which the metal sheet extends and which is aligned with respect to the grounding surface in such a manner that it allows ingression of the metal sheet forced by the TM dielectric resonator body in an area of the grounding surface.

In an embodiment of the disclosure, recesses for accommodating solder applied on a side of the metal sheet away from the grounding surface are provided as an extension of the large hole portion.

In an embodiment of the disclosure, the metal sheet is made of a metal material having a coefficient of expansion that is close to a coefficient of expansion of a dielectric material of the TM dielectric resonator body.

In an embodiment of the disclosure, the metal cavity has a box-shaped cavity body with an open end to be closed by a metal cover, and the stepped blind hole formed in a side wall of the box-shaped cavity body is provided in the form of a notch extending to the open end and in communication with an interior of the box-shaped cavity body all the way.

In an embodiment of the disclosure, a metal block having a thickness in the second direction is sandwiched between the first end surface of the TM dielectric resonator body and a wall of the cavity to which the first end surface is to be connected in a grounding manner.

In an embodiment of the disclosure, the metal block is welded onto the wall of the cavity.

In an embodiment of the disclosure, the wall of the cavity to which the first end surface is connected is configured as a main supporting wall for the TM dielectric resonator body, and the main supporting wall is provided with a blind hole for reducing contact area with the metal block.

In an embodiment of the disclosure, at least an end portion of the metal block that abuts against the wall of the cavity is configured to have a hollow interior.

In an embodiment of the disclosure, the metal block is formed in one piece with the wall of the cavity.

In an embodiment of the disclosure, the TM dielectric resonator body is in the shape of a cross.

In an embodiment of the disclosure, a slot for coupling two modes of the resonator is provided in a central area of a side surface that is cross-shaped in side view, of the TM dielectric resonator body and extends substantially diagonally with respect to the cross shape of the side surface.

According to a second aspect of the disclosure, there is provided a TM dual-mode filter comprising an above-said TM dual-mode dielectric resonator.

With the three-ground-terminal configuration of the TM dual-mode dielectric resonator of the present disclosure, the TM dielectric resonator body can be directly installed into the cavity, windows for coupling between two resonators can be integrated into walls of their cavities. Therefore, the number of components for assembling into a whole filter can be reduced, which thereby facilitates assembling and improves assembling efficiency. Especially, harmonic performance can be improved as well. It also benefits in terms of intermodulation performance, size reduction and high power.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
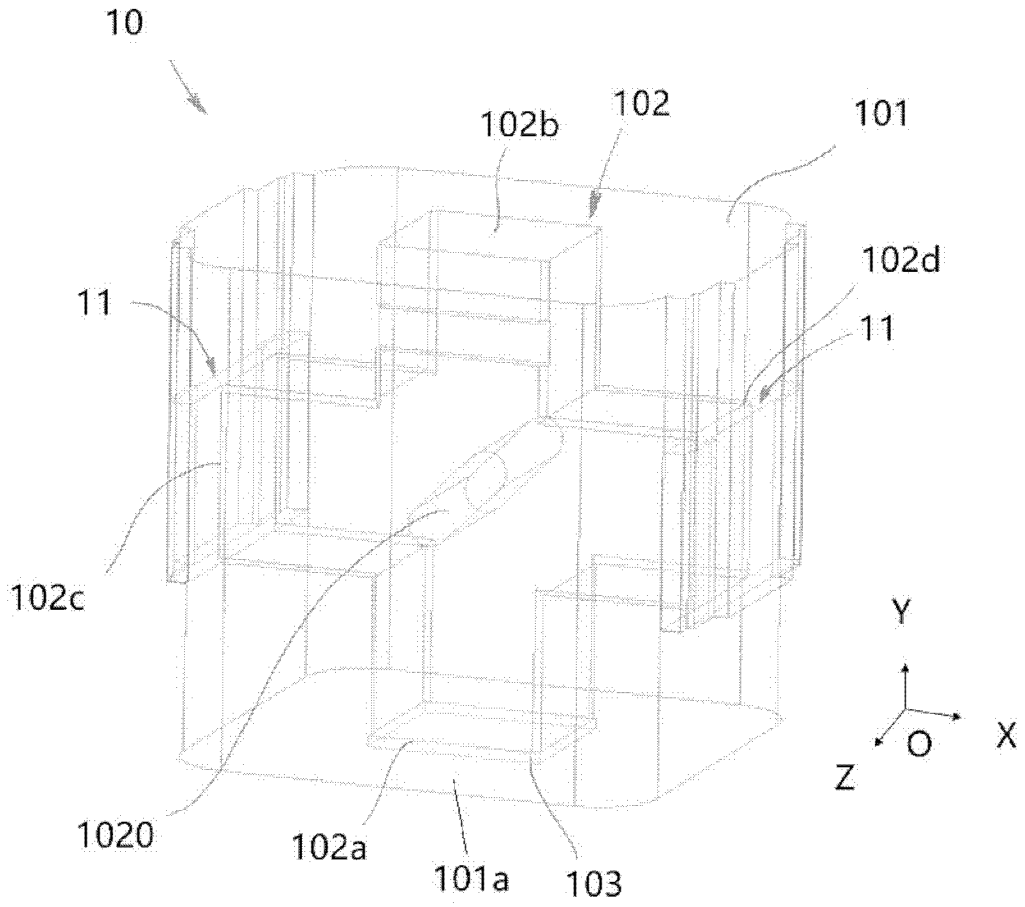
FIG. 1 is a perspective view of a TM dual-mode dielectric resonator according to a first embodiment of the present disclosure.

FIG. 1 shows a transverse magnetic (TM) dual-mode dielectric resonator 10, comprising a metal cavity 101 and a TM dielectric resonator body 102 located in the cavity. In the embodiment shown, the metal cavity 101 is substantially in the shape of a cube or cuboid or the like. The cavity has walls extending substantially in planes defined by any two of X, Y and Z coordinate axes as shown in FIG. 1. It can be understood that other shapes are also possible for the metal cavity. The TM dielectric resonator body 102 is configured in the shape of a cross having four arms. Each arm extends from a crossing portion of the cross towards a wall of the cavity. Two arms of the cross-shaped resonator body 102 extend substantially in the X direction and the other two arms of the cross-shaped resonator body 102 extend substantially in the Y direction.

In the embodiment as shown in FIG. 1, the cross-shaped resonator body 102 is placed in a vertical position where two arms extend vertically along the Y direction. As a variant, the cross-shaped resonator body 102 can be placed in a horizontal position where all the four arms of the cross extend horizontally. No matter whether the resonator body 102 is placed in a vertical position or in a horizontal position, only three of the four arms of the cross-shaped resonator body are electrically connected with respective walls of the cavity 101 (i.e. three-ground-terminal configuration). Referring to FIG. 1, two arms that extend substantially in the X direction are in electrical connection with side walls of the cavity so that their end surfaces 102*c*, 102*d* are placed in a grounding state, and the lower arm extending in the Y direction is in electrical connection with a bottom wall 101*a* of the cavity so that its lower end surface 102*a* is placed in a grounding state. The upper arm extending in the Y direction has its end surface 102*b* spaced from a top wall of the cavity by a gap and thus placed in a non-grounding state.

Figure 2:
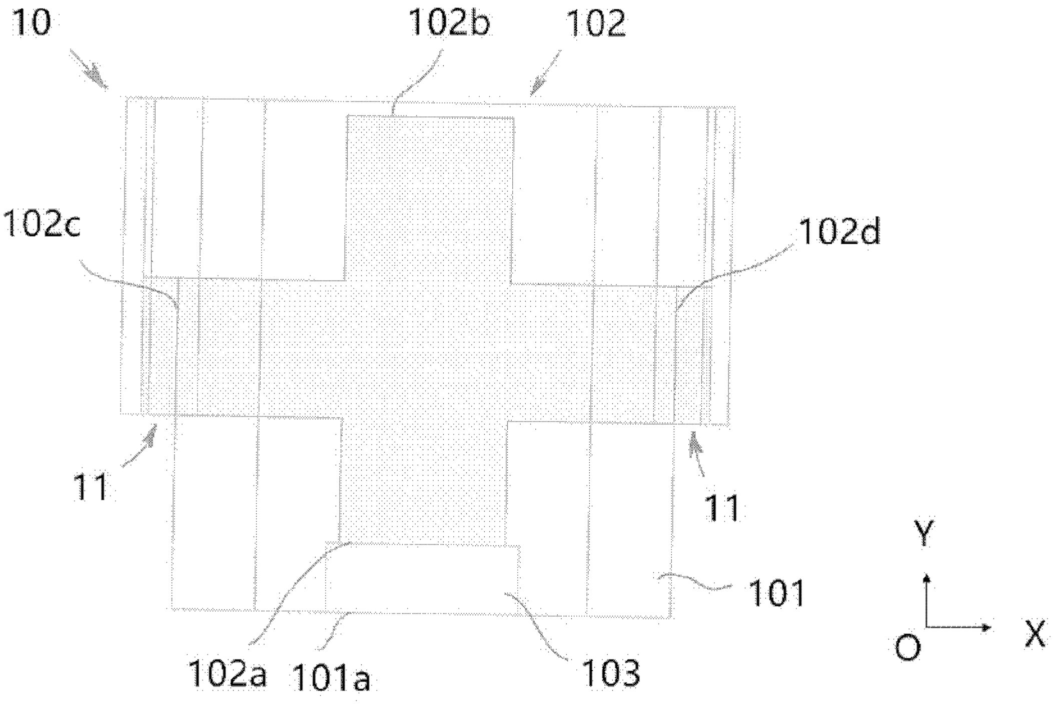
FIG. 2 is a side view of a TM dual-mode dielectric resonator according to a second embodiment of the present disclosure.

Particularly, referring to FIG. 2, the gap between the end surface 102*b* of the upper arm and the top wall of the cavity is appropriately designed. By doing so, it can be easily ensured that when attaching a top metal cover serving as the top wall of the cavity, the top end of the upper arm is not in contact with an inside surface of the top wall and that no force is being applied to the upper arm and thus no damage is caused thereto during the whole assembling process or during the operation of the resonator. More importantly, the TM dual mode dielectric resonator 10 with three grounding arms is found to have better harmonic performance than a TM dual mode dielectric resonator with four grounding arms.

Although it is shown in FIGS. 1 and 2 that the TM dielectric resonator body 102 is substantially cross-shaped, it can be readily understood that the TM dielectric resonator body 102 can be configured in other shapes, for example, a substantially cylindrical shape or a substantially spherical, cubic and cuboid shape or the like, as long as the TM dielectric resonator body has two grounding surfaces which are substantially perpendicular to a first direction (for example, the X direction) in which a first electrical field of the TM dual-mode dielectric resonator extends and one grounding surface which is substantially perpendicular to a second direction (for example, the Y direction) in which a second electrical field of the TM dual-mode dielectric resonator extends.

Hereinbelow, the term "end surface" refers to all the surfaces of the TM dielectric resonator body that are substantially perpendicular to the directions of the electrical fields created in the TM dual-mode dielectric resonator and intended to approach or reach walls of the cavity of the resonator. The end surface may be a curved or flat surface.

The TM dielectric resonator body 102 can be made of any dielectric material, for example, ceramic. The surfaces of the TM dual-mode dielectric resonator body that are to be electrically connected with walls of the cavity may be coated in advance with a layer of conductive material, for example, silver. And the metal cavity 101 can be made of aluminum, for example, by a casting technology.

Hereinbelow, the term "metal cavity" refers to a metal-walled chamber defined in a hollow body having walls made of a metal material or covered with a layer of metal. For example, it can be formed by bending sheet metal into a cavity or shaped by mold casting of metal, or by forming a non-metal material (for example, plastic material) into a cavity shape and covering its surface with a metal layer, for example, by surface metallization (for example, surface plating).

In the embodiments shown in FIGS. 1 and 2, a metal block 103 having a thickness in the Y direction is sandwiched between the bottom surface 102*a* of the lower arm and the bottom wall 101*a* of the cavity 101. The thickness of the metal block 103 can be configured in such a manner that frequency of the TM dual-mode dielectric resonator 10 can be reduced to a proper level. By doing this, the influence caused by the non-grounding of the upper arm in terms of frequency can be reduced to a minimum. It can be readily understood that, the increase in frequency caused by the non-grounding of the upper arm can also be reduced or compensated, for example, by increasing a cross-sectional area of the upper and/lower arms extending in the Y direction.

The metal block 103 can be a component separate from the bottom wall 101*a* of the cavity or be in one piece with the bottom wall 101*a* of the cavity. And the metal block 103 can be made of a metal material which is the same as or different from the metal material chosen for the cavity 101. In a particular embodiment, the metal block 103 is formed integrally with the metal cavity by means of casting. And the thickness of the metal block can be adjusted accordingly by machining. In this way, the metal block 103 can provide a top surface as flat as possible for reliable connection with the TM dielectric resonator body 102. In another embodiment, the metal block 103 is connected, as a separate component, to the bottom wall 101*a* of the cavity 101, for example, by welding.

Figure 4:
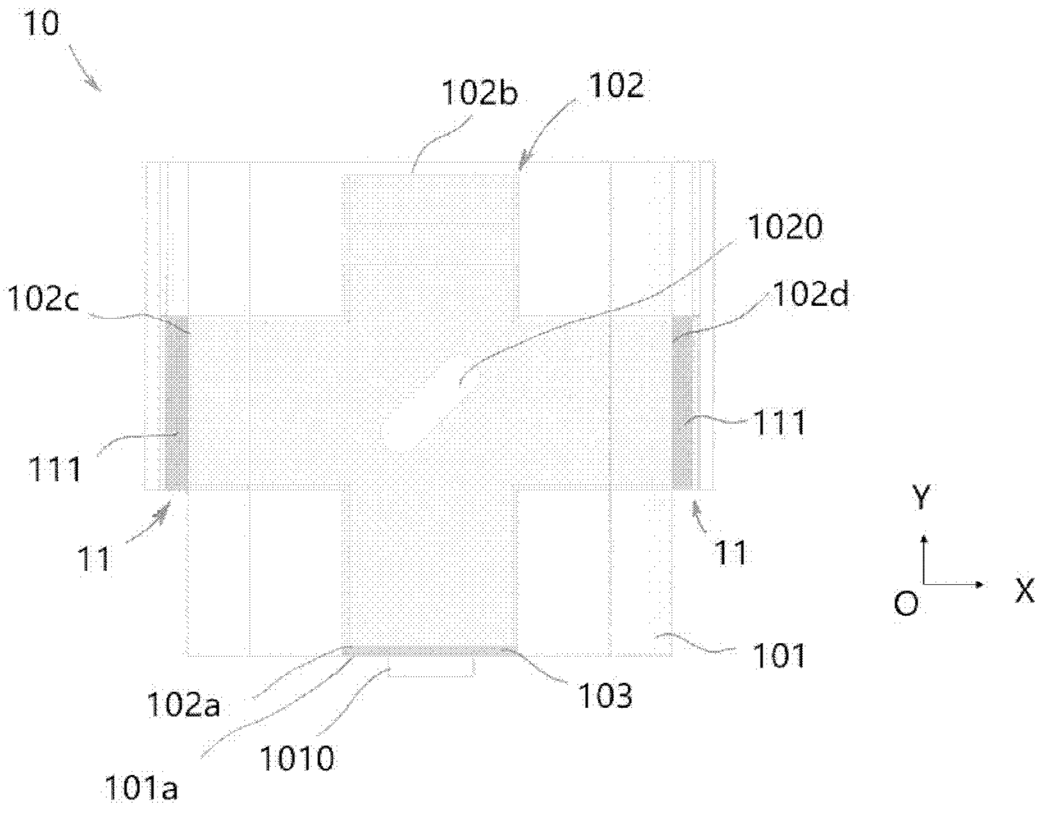
FIG. 4 is a side view of a TM dual-mode dielectric resonator according to a third embodiment of the present disclosure.
Figure 5:
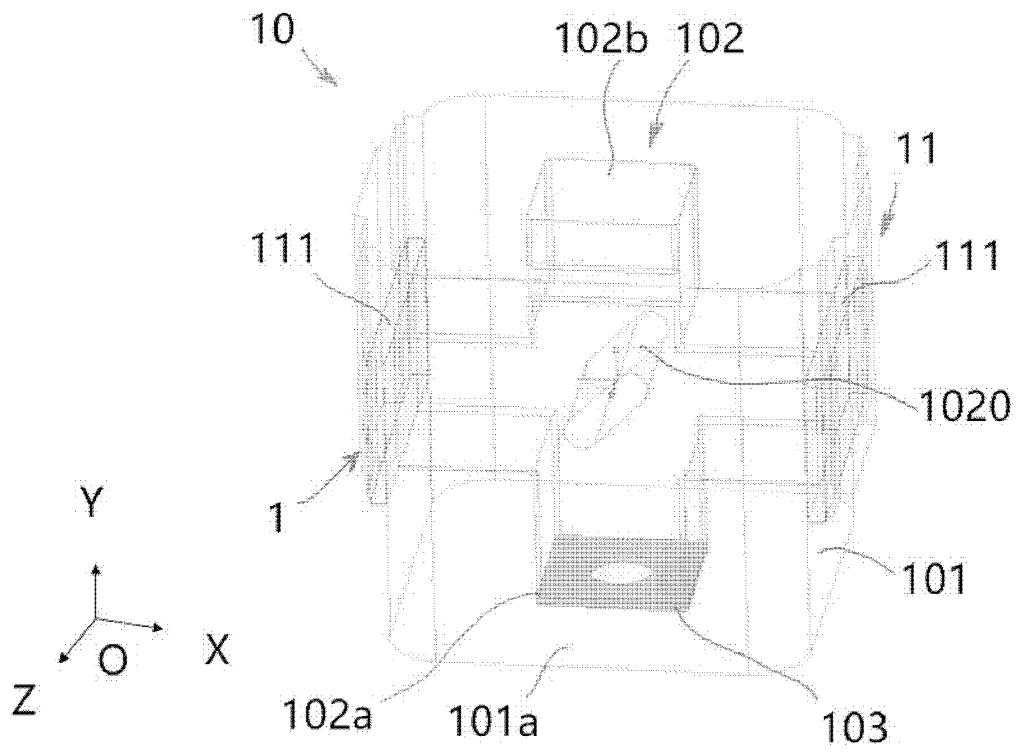
FIG. 5 is a perspective view of a TM dual-mode dielectric resonator according to a fourth embodiment of the present disclosure.
Figure 6:
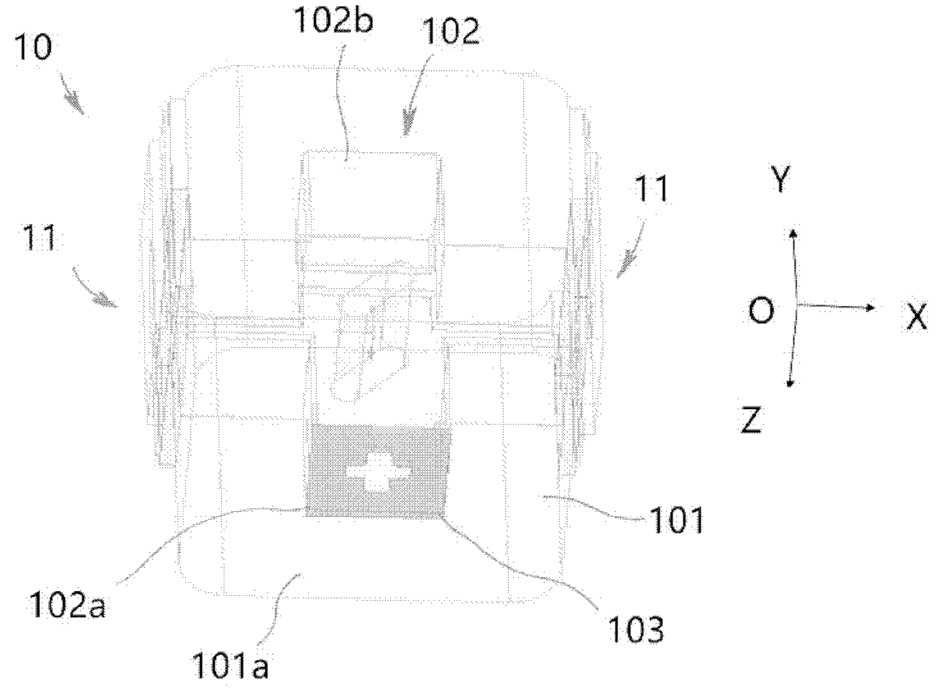
FIG. 6 is a perspective view of a TM dual-mode dielectric resonator according to a fifth embodiment of the present disclosure.

In the embodiment shown in FIG. 2, the bottom wall 101*a* of the cavity 101, with which the bottom end of the lower arm is connected in a grounding manner, functions as a main supporting wall for the TM dielectric resonator body 102. And the metal block 103 thus functions as an intermediate boss for supporting the TM dielectric resonator body 102 as well. Referring to FIG. 4, the main supporting wall is provided with a blind hole 1010 for reducing contact area with the metal block 103. The blind hole 1010 has an opening covered by the metal block 103, so that the meal block 103 contacts the main supporting wall only in an area surrounding the blind hole 1010, rather than in the whole area corresponding to the overlapping between the metal block 103 and the main supporting wall. Also, solder is required to be applied to the contact area only. The provision of the blind hole 1010 therefore reduces welding area between the metal block and the main supporting wall, which improves the reliability in the connection between the metal block 103 and the main supporting wall. Additionally, or optionally, for a similar purpose of reducing welding area and improving reliability, at least an end portion of the metal block 103 that abuts against the main supporting wall is configured to have a hollow interior. In an embodiment as shown in FIGS. 5 and 6, the metal block 103 has a closed hollow cross-section over its entire thickness along the Y direction. The hollow may be designed to have a circular cross-section or a cross-shaped cross-section. It can be understood that any other cross-sectional shape is also possible for the hollow interior of the metal block. Weight can be reduced as well due to the hollow design in the metal block.

In the embodiments shown in FIGS. 1-6, end surfaces 102*c*, 102*d* of the arms extending in the X direction are connected as grounding surfaces with the walls of the cavity 101 by means of an immediate grounding structure 11. Particularly, referring to FIG. 3, the immediate grounding structure 11 comprises a metal sheet 111 attached to the grounding surface and a stepped blind hole 112 formed in the wall of the cavity 101. The stepped blind hole 112 comprises a large hole portion 112*a* for receiving the metal sheet and a small hole portion 112*b* over which the metal sheet extends. The metal sheet 111 is placed as a bridge over an opening of the small hole portion 112*b* oriented towards the metal sheet, with ends of the metal sheet 111 resting against opposite shoulders formed between the large hole portion 112*a* and the small hole portion 112*b* of the stepped blind hole 112. The small hole portion 112*b* is located in a position that is substantially aligned with respect to the grounding surface and the opening of the small hole portion 112*b* oriented towards the metal sheet is sized in such a manner that it allows ingression of the metal sheet forced by the TM dielectric resonator body in an area of the associated grounding surface, in case of thermal expansion and deformation of the metal sheet and the TM dielectric resonator body. When the metal sheet 111 and the TM dielectric resonator body 102 experience deformation caused by thermal expansion, the small hole portion 112*b* will provide a space to accommodate dimensional changes that accompany deformation and prevent excessive stress from being created in the TM dielectric resonator body 102. Additionally, the metal sheet 111, by means of its slight deformation caused by thermal expansion at high temperatures, can function to buffer a temperature-related stress between the metal cavity 101 and the TM dielectric resonator body 102 and prevent the TM dielectric resonator body 102 from breaking. When the temperature of the TM dielectric resonator body 102 and the metal sheet 111 returns to normal, the metal sheet will bounce back to its original form by means of its inherent resilience.

The metal sheet 111 is made of a metal material which has a coefficient of expansion close to that of a dielectric material of the TM dielectric resonator body. With this configuration, it can be ensured that the grounding surface of the TM dielectric resonator body 102 is always kept in sufficient contact with the metal sheet 111 and the solder applied therebetween can be prevented from peeling off from either the grounding surface or the metal sheet 111, irrespective of whether the TM dielectric resonator body 102 is subject to a thermal expansion upon a temperature increase or a thermal shock upon a temperature drop. The metal sheet 111 inserted between the grounding surface of TM dielectric resonator body and the small hole portion 112*b* can play an important function of buffering, especially in case there is a great gap between coefficients of expansion of the metal material for the cavity 101 and the dielectric material selected for the TM dielectric resonator body 102.

Figure 3:
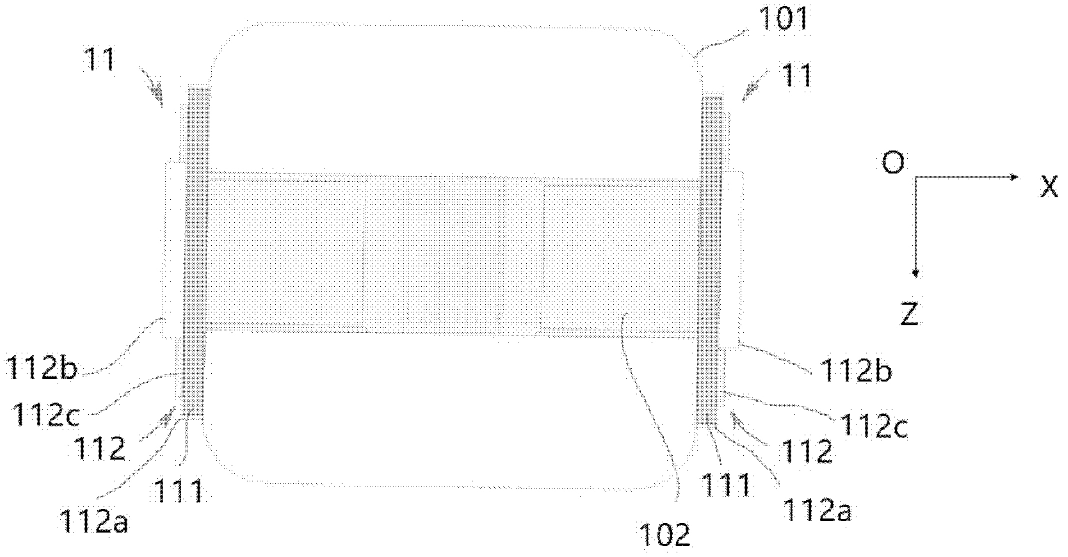
FIG. 3 is a top view of a TM dual-mode dielectric resonator according to the second embodiment of the present disclosure.

In a preferable embodiment shown in FIG. 3, for ensuring enough connection between the metal sheet 111 and the wall of the cavity 101, solder is applied between the metal sheet 111 and the shoulders formed between the large hole portion 112*a* and the small hole portion 112*b*. Recesses 112*c* for accommodating the solder applied on a side of the metal sheet 111 away from the associated grounding surface are provided as an extension of the large hole portion 112*a*. In this way, during installation, solder applied on the side surface of the metal sheet 111 facing the shoulders can be prevented from being scratched off.

In one embodiment of the present disclosure, the metal cavity 101 can be configured as having a box-shaped cavity body, for example, with an upper open end to be closed by a metal cover, and the stepped blind holes 112 are formed in side walls of the box-shaped cavity body and configured in the form of a notch extending to the opened end and in communication with an interior of the box-shaped cavity body all the way. That is, both the large hole portion 112*a* and the small hole portion 112*b* of each stepped blind hole 112 open in the direction of the open end of the box-shaped cavity body and also in the direction of the interior of the cavity. With this configuration, when the TM dielectric resonator body 102 is installed into the metal cavity 101 through the upper opening of the box-shaped cavity body cavity, the metal sheet 111 attached to the grounding surface of the TM dielectric resonator body 102 can be moved together in the vertical direction (i.e. Y direction) along the large hole portion 112*a* and positioned in place when the TM dielectric resonator body 102 is well installed. Then the metal cover is attached to the top of the box-shaped cavity body cavity. The whole installation process can thus be made simple and easy, which reduces the manufacturing cost of the entire resonator 10.

Although it is shown in FIGS. 1-6 that the intermediate grounding structure 11 is applied to both end surfaces 102*c*, 102*d* of the arms extending in the X direction, it can be understood that, all the three grounding surfaces 102*a*, 102*c*, 102*d* may be connected with walls of the cavity by means of the intermediate grounding structure 11, for example, in case where the cross-shaped dielectric resonator body 102 is placed in a horizontal position.

In the embodiments shown in FIGS. 1 and 4, a slot 1020 for coupling two modes of the resonator 10 is provided in a central area of a side surface that is cross-shaped in side view, of the TM dielectric resonator body 102 and extends substantially diagonally with respect to the cross shape of the side surface. It can be understood that the slot can be dispensed with if a parallel coupling topology is required for the resonator 10.

Figure 7:
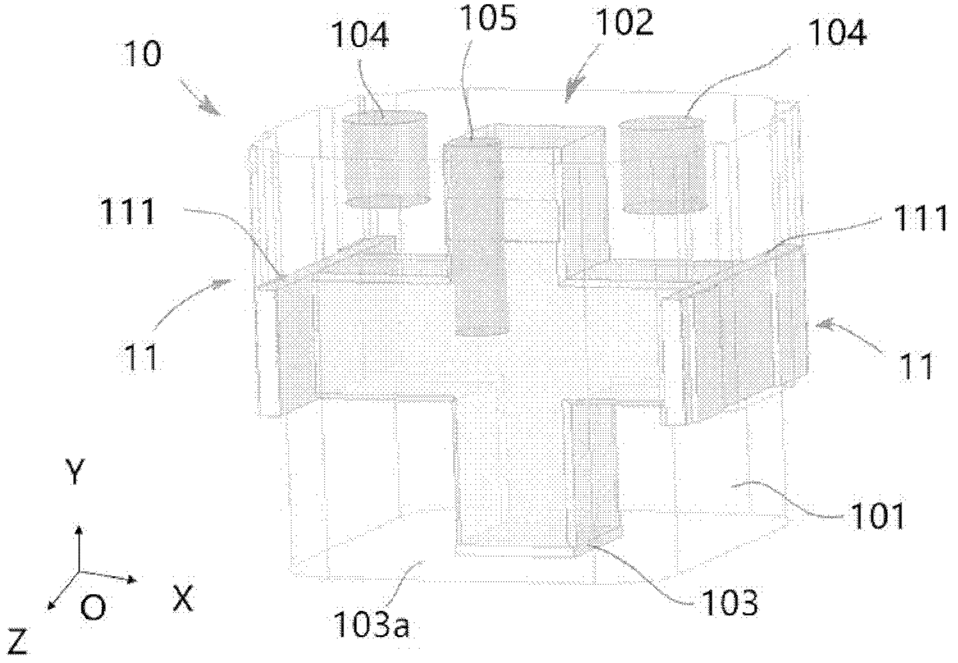
FIG. 7 is a perspective view of a TM dual-mode dielectric resonator according to a sixth embodiment of the present disclosure.
Figure 8:
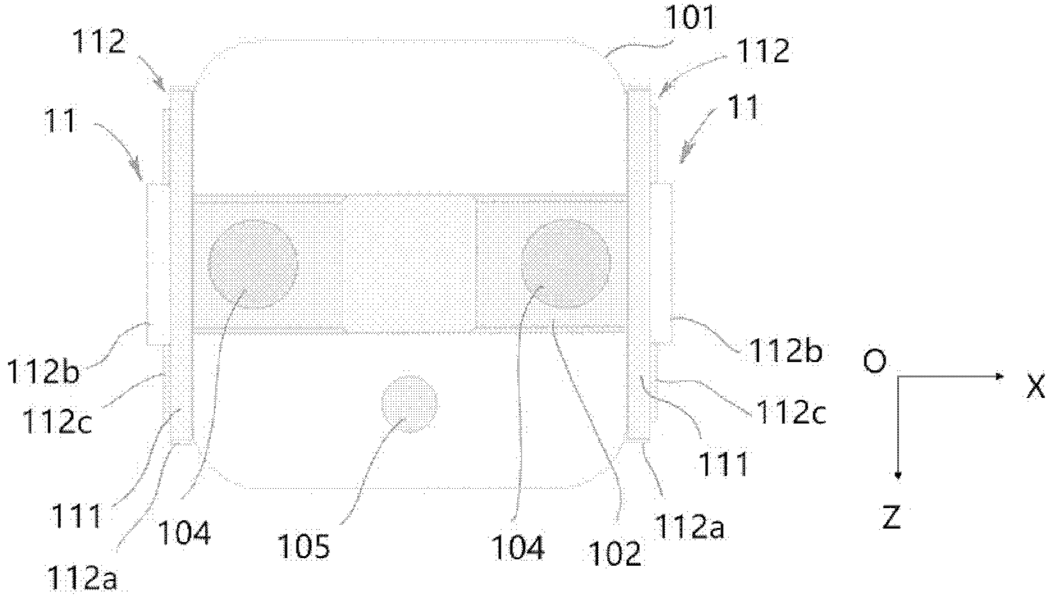
FIG. 8 is a top view of the TM dual-mode dielectric resonator according to the sixth embodiment of the present disclosure.

Referring to FIGS. 7 and 8, two frequency tuning screws 104 are located in the metal cavity 101 in the area of the shoulders of the cross-shaped TM dielectric resonator body 102, in order to tune the frequencies of the two modes respectively. Additionally, or optionally, coupling tuning screws 105 can be provided in regions adjacent to the side surfaces of the TM dual-mode dielectric resonator body that are perpendicular to the Z direction, so as to tune the coupling between the two modes.

Figure 9:
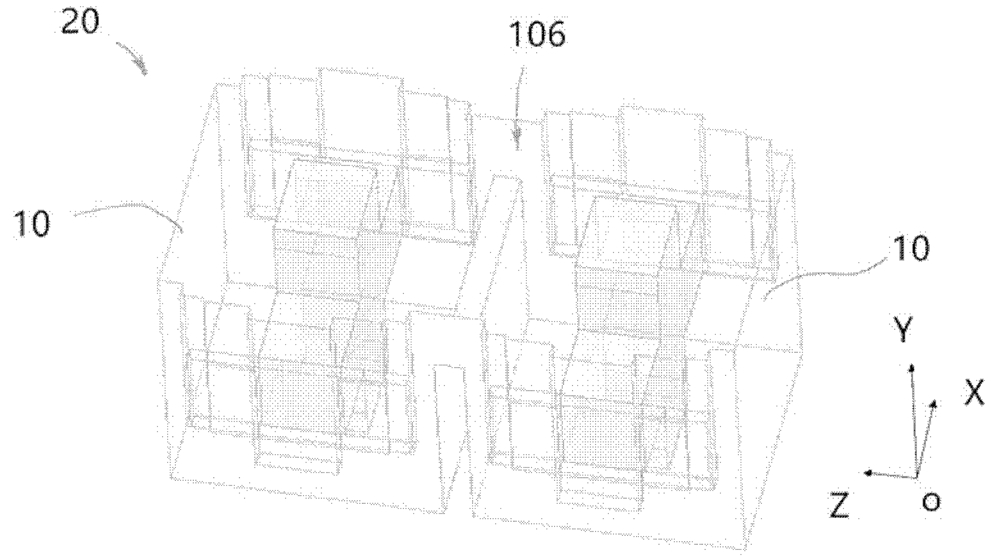
FIG. 9 is a perspective view of a first example of a filter comprising two TM dual-mode dielectric resonators coupled with each other.
Figure 10:
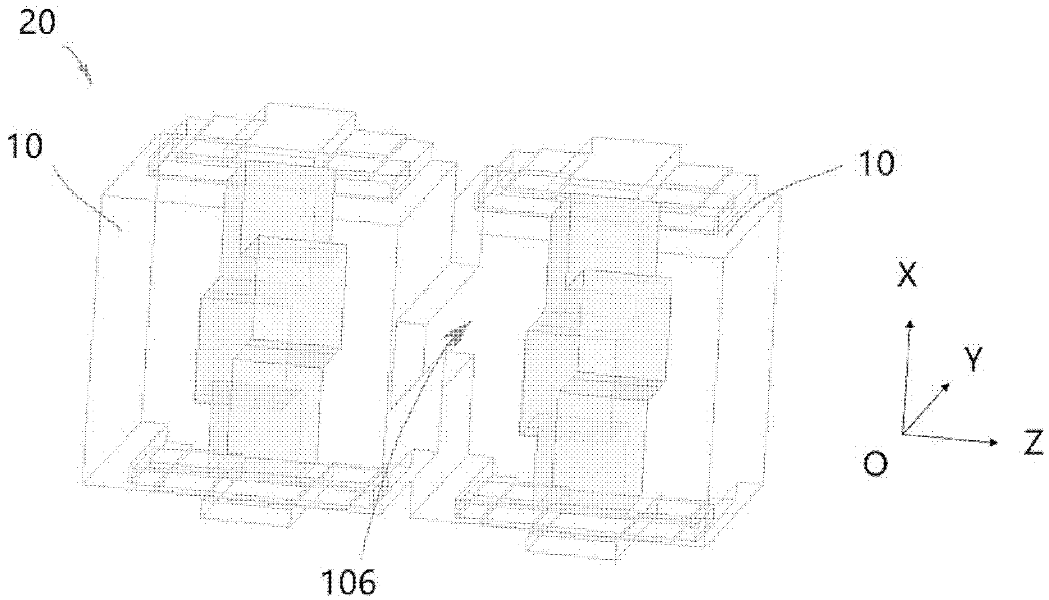
FIG. 10 is a perspective view of a second example of a filter comprising two TM dual-mode dielectric resonators coupled with each other.

FIGS. 9 and 10 show two TM dual-mode dielectric resonators 10 are coupled through a window 106 provided in a common wall of the cavities of the two resonators. Depending on the location/orientation or dimension of the window, the coupling between the two TM dual-mode dielectric resonators can be made totally different. For example, through the window 106 extending horizontally as shown in FIG. 9, the coupling of the two modes in a Y-direction electric field can be realized. Whereas through the window 106 extending vertically as shown in FIG. 10, the coupling of the two modes in an X-direction electric field can be achieved.

Figure 11:
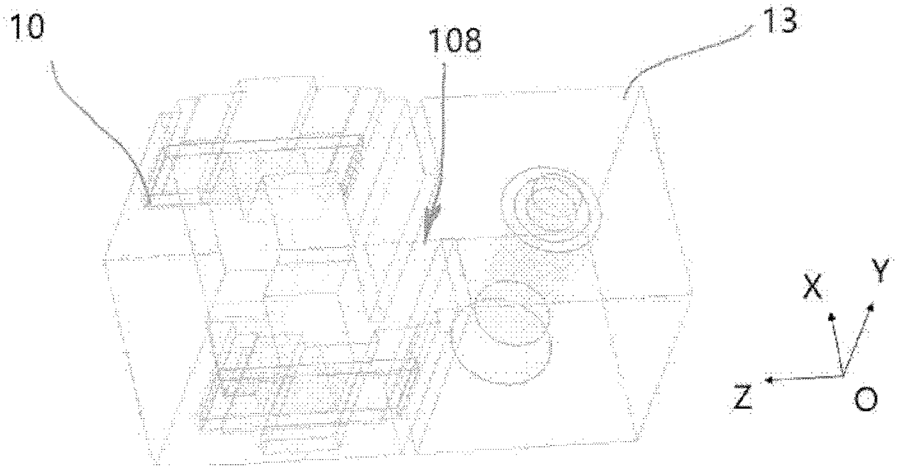
FIG. 11 is a perspective view of a third example of a filter comprising a TM dual-mode dielectric resonator and a metal resonator coupled with each other.
Figure 12:
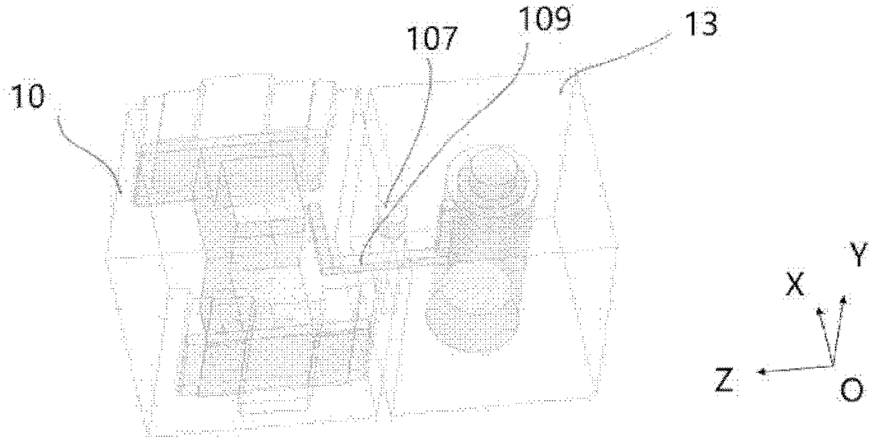
FIG. 12 is a perspective view of a fourth example of a filter comprising a TM dual-mode dielectric resonator and a metal resonator coupled with each other.
Figure 13:
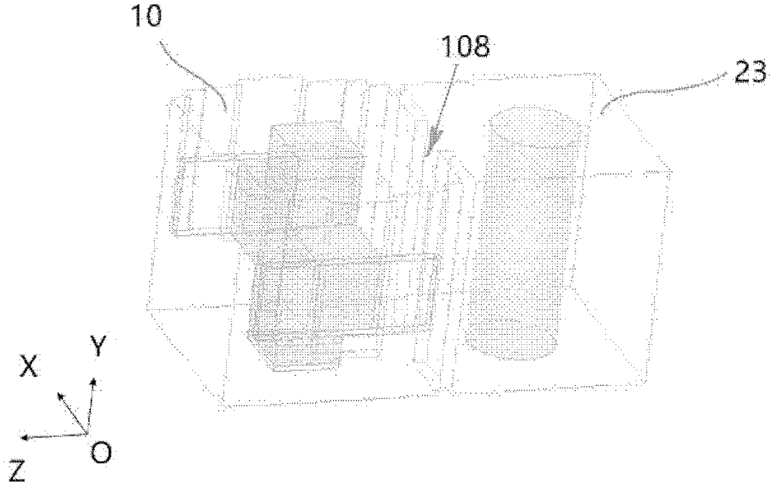
FIG. 13 is a perspective view of a fifth example of a filter comprising a TM dual-mode dielectric resonator and a TM mode resonator coupled with each other.

FIGS. 11 and 12 shows that the coupling between a metal single-mode resonator 13 and a TM dual mode dielectric resonator 10 of the present disclosure can be realized through a coupling window 108 (see FIG. 11), or through other coupling structures (for example, coupling windows and screws 107 and/or wires 109 as shown in FIG. 12). FIG. 13 shows a TM dual mode dielectric resonator 10 is coupled to a single-mode TM resonator 23 by a coupling window 108.

Figure 14:
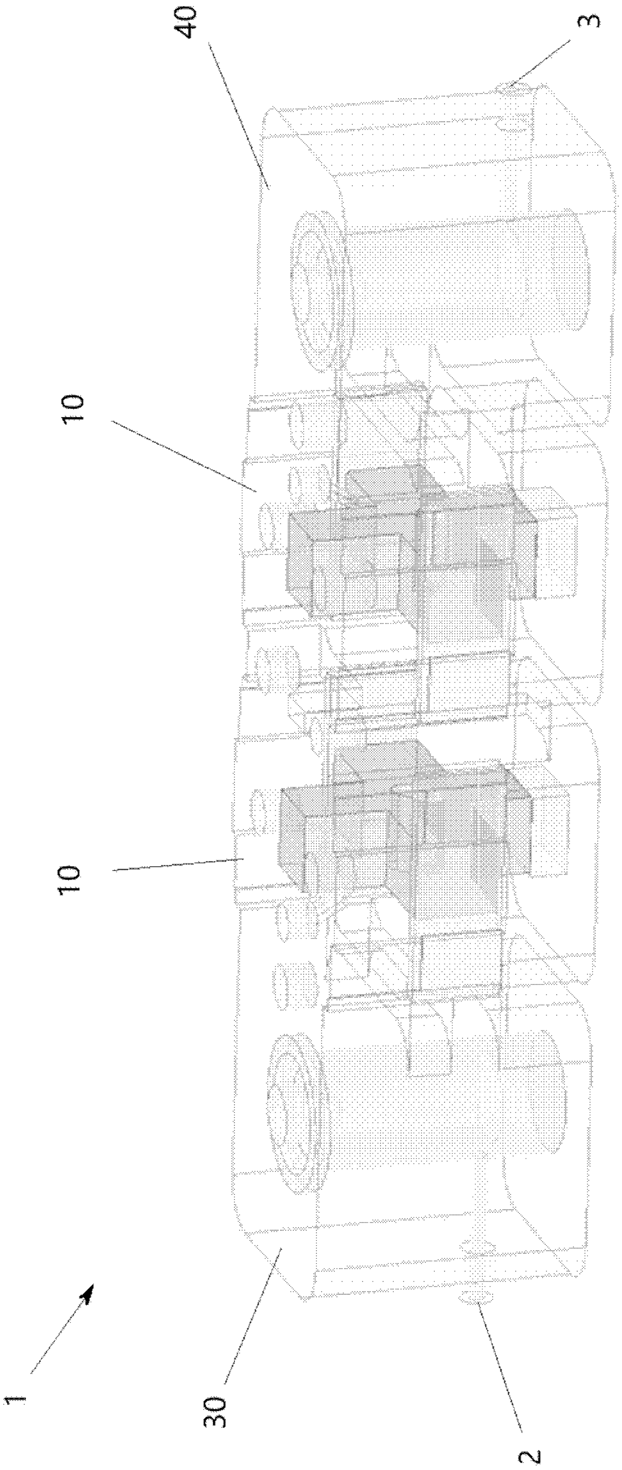
FIG. 14 shows a TM dual-mode filter of the present disclosure.

FIG. 14 shows an example of a TM dual mode filter 1 comprising two TM dielectric dual-mode resonators 10 of the present disclosure, an input co-axial resonator 30 and an output co-axial resonator 40. All the resonators are coupled in series. Signal is input via an input connector 2 into the input co-axial resonator 30, and transmitted through the TM dielectric dual-mode resonators 10 and the output xo-axial resonator 40, and then output through an output connector 3.

Figure 15:
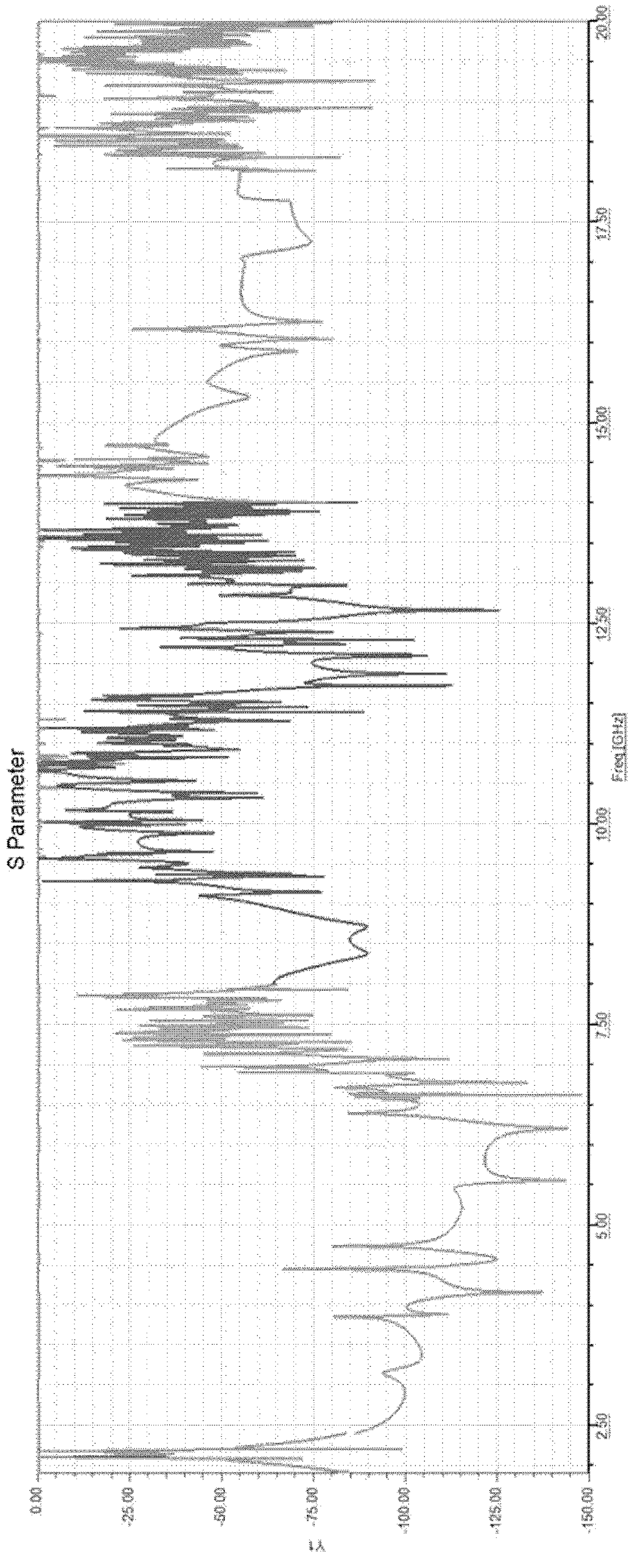
FIG. 15 shows the S parameter curve of the TM dual-mode filter as shown in FIG. 14.

FIG. 15 shows the S parameter curve of the TM dual mode filter 1 of FIG. 14 in which the TM dual-mode dielectric resonators 10 each have a cross-shaped TM dielectric resonator body 102 with only three grounding surfaces. The S parameter curve shows that the filter has farther higher harmonics and has better near-end suppression performance.

Within the TM dual mode dielectric resonator 10 of the present disclosure, the dielectric resonator body 102 can be installed into the metal cavity 101 directly, without the need of additionally providing elastic members on the top cover for adapting to thermal expansion of the dielectric resonator body. The number of components required and the assembling difficulty can therefore be reduced and the overall assembling efficiency can be improved. Furthermore, as compared with TM dual-mode dielectric resonators with four grounding surfaces or four grounding terminals, the TM dielectric dual-mode resonators with three grounding surfaces has better harmonic performance.

According to the present disclosure, the coupling window can be formed in one piece with the metal cavity and properly located with respect to the dielectric resonator body, for example, by cutting off a portion of walls of the metal cavity made in one piece by casting. Or, an aperture or slot or opening to be used as the coupling window may be formed during the casting of the metal cavity. Furthermore, all the cavities of the resonators connected in series can be formed in one piece. In this way, the assembling steps required for connecting all the resonators can be dispensed with. The assembling efficiency can be improved further if the coupling windows are integrated into the whole cavity body.

Although it is shown in FIG. 14 that four resonators are coupled to form a filter, the number of resonators can be changed so as to influence the near band attenuation/selectivity of the filter as expected.

The terms "top", "bottom", "upper" and "lower" used herein refer to the orientations when the TM dual-mode dielectric resonator is placed in a position as shown in FIG. 1. These orientation words are used only for easy understanding, but should not be interpreted as limitative.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A TM dual-mode dielectric resonator, comprising:

a metal cavity; and a TM dielectric resonator body located in the cavity and having grounding surfaces connected with walls of the cavity so that two electric fields are formed in first and second directions perpendicular to each other, wherein two end surfaces of the TM dielectric resonator body which are perpendicular to the first direction and a first end surface of the TM dielectric resonator body which is perpendicular to the second direction are configured as the grounding surfaces, and a second end surface of the TM dielectric resonator body which is perpendicular to the second direction is placed in a non-grounding state.

2. The TM dual-mode dielectric resonator according to claim 1, wherein at least one of the grounding surfaces is in grounding connection with a wall of the cavity by means of an immediate grounding structure, the immediate grounding structure comprising a metal sheet attached to the grounding surface and a stepped blind hole formed in the wall of the cavity, wherein the stepped blind hole comprises a large hole portion for receiving the metal sheet and a small hole portion over which the metal sheet extends and which is aligned with respect to the grounding surface in such a manner that it allows ingression of the metal sheet forced by the TM dielectric resonator body in an area of the grounding surface.

3. The TM dual-mode dielectric resonator according to claim 2, wherein recesses for accommodating solder applied on a side of the metal sheet away from the grounding surface are provided as an extension of the large hole portion.

4. The TM dual-mode dielectric resonator according to claim 2, wherein the metal sheet is made of a metal material having a coefficient of expansion that is close to a coefficient of expansion of a dielectric material of the TM dielectric resonator body.

5. The TM dual-mode dielectric resonator according to claim 2, wherein the metal cavity has a box-shaped cavity body with an open end to be closed by a metal cover, and the stepped blind hole formed in a side wall of the box-shaped cavity body is provided in the form of a notch extending to the open end and in communication with an interior of the box-shaped cavity body all the way.

6. The TM dual-mode dielectric resonator according to claim 1, wherein a metal block having a thickness in the second direction is sandwiched between the first end surface of the TM dielectric resonator body and a wall of the cavity to which the first end surface is to be connected in a grounding manner.

7. The TM dual-mode dielectric resonator according to claim 6, wherein the metal block is welded onto the wall of the cavity.

8. The TM dual-mode dielectric resonator according to claim 7, wherein the wall of the cavity to which the first end surface is connected is configured as a main supporting wall for the TM dielectric resonator body, and the main supporting wall is provided with a blind hole for reducing contact area with the metal block.

9. The TM dual-mode dielectric resonator according to claim 7, wherein at least an end portion of the metal block that abuts against the wall of the cavity is configured to have a hollow interior.

10. The TM dual-mode dielectric resonator according to claim 6, wherein the metal block is formed in one piece with the wall of the cavity.

11. The TM dual-mode dielectric resonator according to claim 1, wherein the TM dielectric resonator body is in the shape of a cross.

12. The TM dual-mode dielectric resonator according to claim 11, wherein a slot for coupling two modes of the resonator is provided in a central area of a side surface that is cross-shaped in side view, of the TM dielectric resonator body and extends substantially diagonally with respect to the cross shape of the side surface.

13. A TM dual-mode filter comprising a TM dual-mode dielectric resonator according to claim 1.

* * * * *